(12) United States Patent
Prud'homme-Lacroix et al.

(10) Patent No.: US 9,340,285 B2
(45) Date of Patent: May 17, 2016

(54) SUSPENSION SYSTEM FOR CARRYING AN EXTERNAL LOAD WITH AN AIRCRAFT, AND AN AIRCRAFT

(71) Applicant: AIRBUS HELICOPTERS, Marignane (FR)

(72) Inventors: Pierre Prud'homme-Lacroix, Vitrolles (FR); Patrice Garcin, Ensues (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 14/325,648

(22) Filed: Jul. 8, 2014

(65) Prior Publication Data

US 2015/0014485 A1    Jan. 15, 2015

(30) Foreign Application Priority Data

Jul. 10, 2013    (FR) ...................................... 13 01634

(51) Int. Cl.
*B64D 1/22*    (2006.01)
*B64C 1/22*    (2006.01)
*B64C 27/04*    (2006.01)

(52) U.S. Cl.
CPC ... *B64D 1/22* (2013.01); *B64C 1/22* (2013.01); *B64C 27/04* (2013.01)

(58) Field of Classification Search
CPC ..................................... B64D 1/22; B64C 1/22
See application file for complete search history.

(56) References Cited

U.S. PATENT DOCUMENTS

| | | | |
|---|---|---|---|
| 1,825,329 A * | 9/1931 | Adams ........................... | 258/1.2 |
| 2,364,042 A | 12/1944 | Anderson | |
| 3,044,818 A | 7/1962 | Tobey | |
| 3,227,401 A | 1/1966 | Currier | |
| 3,845,937 A | 11/1974 | Johnson et al. | |
| 3,993,941 A | 11/1976 | Mayer | |
| 4,736,641 A | 4/1988 | Reid | |
| 4,750,691 A * | 6/1988 | Hollrock et al. ............ | 244/137.1 |
| 6,533,220 B2 * | 3/2003 | Schuster .................... | 244/118.1 |
| 6,896,230 B2 | 5/2005 | Cvek | |
| 2007/0256650 A1 | 11/2007 | Ethelmer Pflughoeft | |

FOREIGN PATENT DOCUMENTS

FR    2271924    12/1975
JP    2010280382    12/2010

OTHER PUBLICATIONS

French Search Report for FR 1301634, Completed by the French Patent Office on Mar. 26, 2014, 6 Pages.

* cited by examiner

*Primary Examiner* — Tien Dinh
*Assistant Examiner* — Richard R Green
(74) *Attorney, Agent, or Firm* — Brooks Kushman P.C.

(57) ABSTRACT

A suspension system (10) of an aircraft (1). The suspension system (10) comprises a fastener device (15) including a coupling member (20) suitable for carrying a load (5) with a sling (21). The suspension system (10) has a return device (30) that comprises a linkage (40) provided with a plurality of bars (41, 42, 43) hinged in pairs to apply a non-linear force to the coupling device (15), said linkage (40) being suitable for fastening to a load-carrier structure (2) of an aircraft (1). In addition, the return device (30) includes a tie (35) connecting said linkage (40) to the coupling device (15), as well as a spring member (36) fastened to a bar (41) of the linkage (40) and suitable for being connected to an aircraft (1).

20 Claims, 3 Drawing Sheets

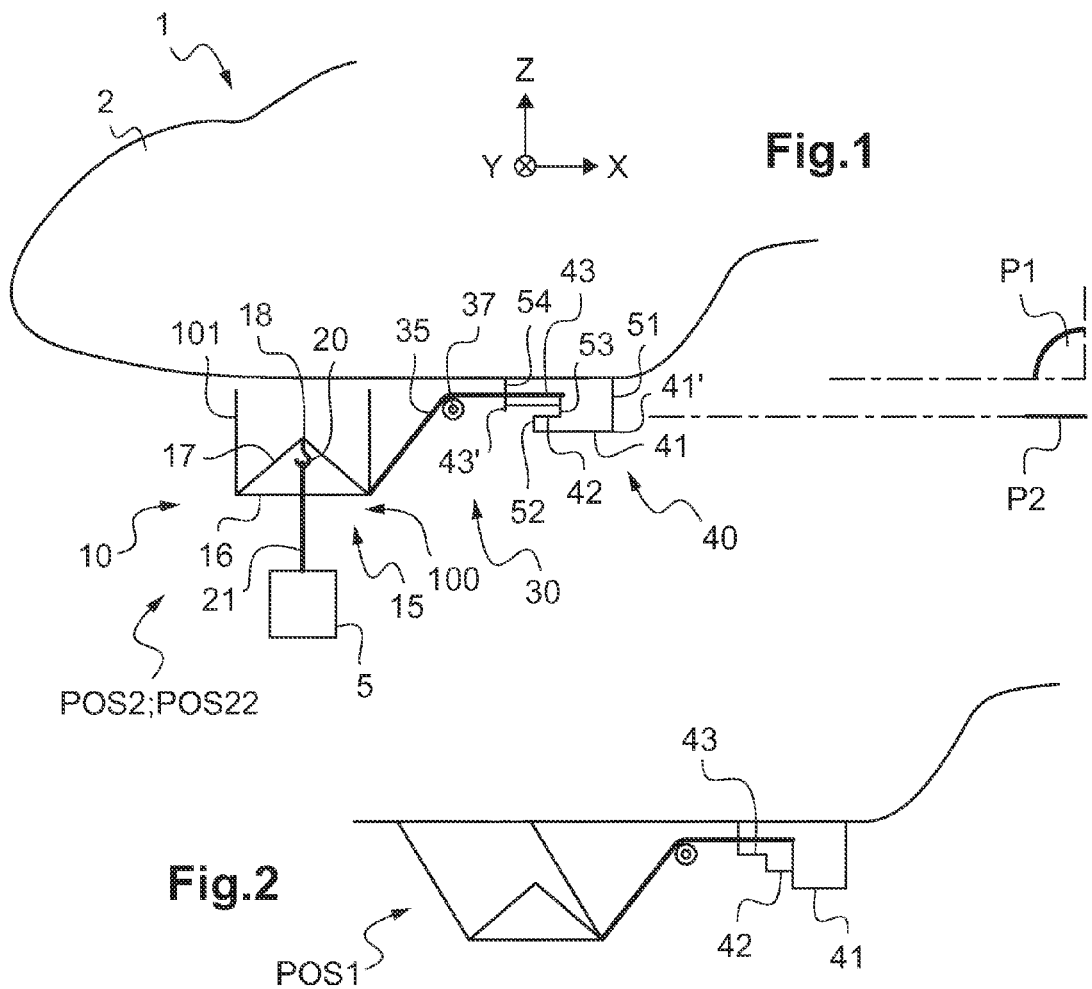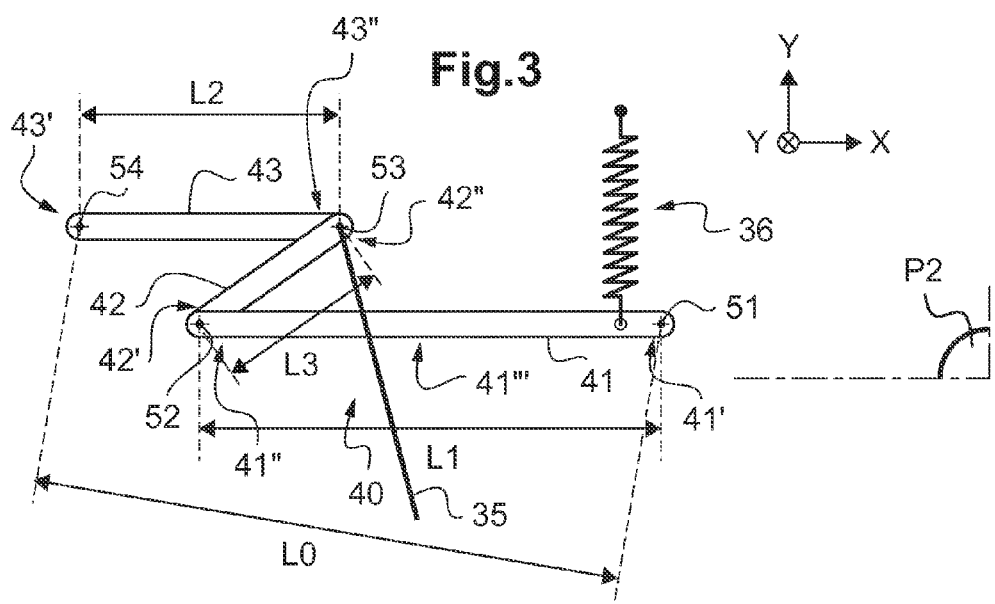

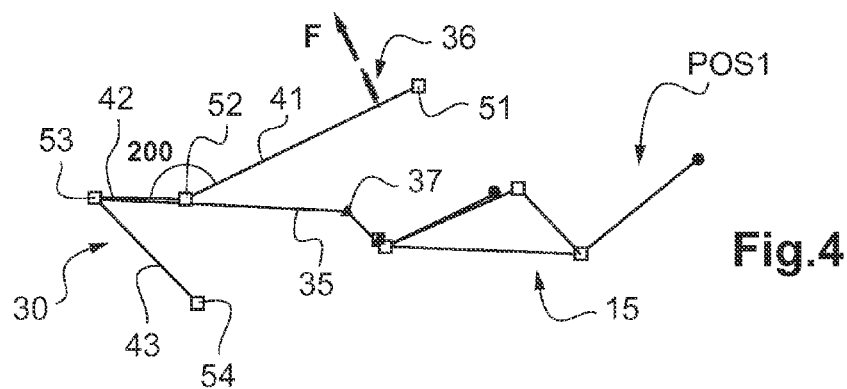
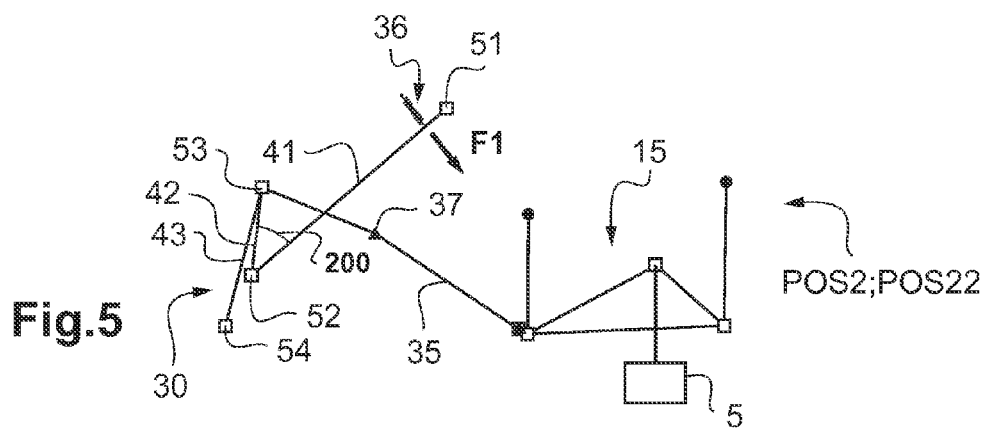
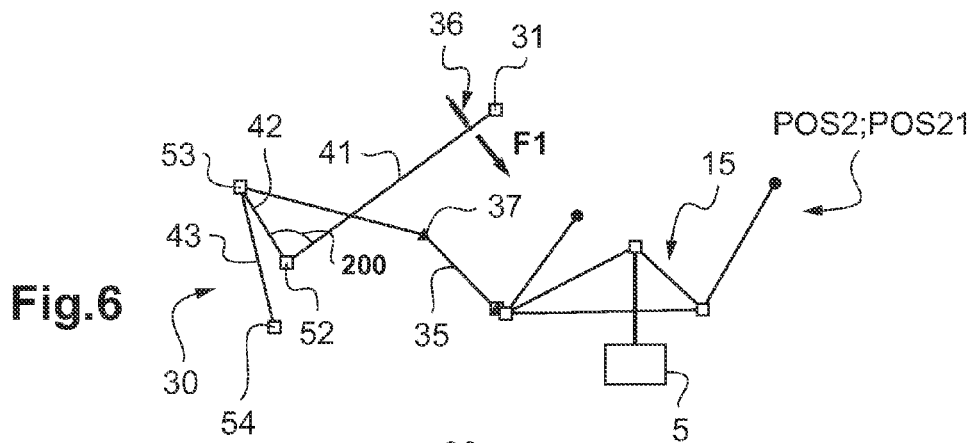
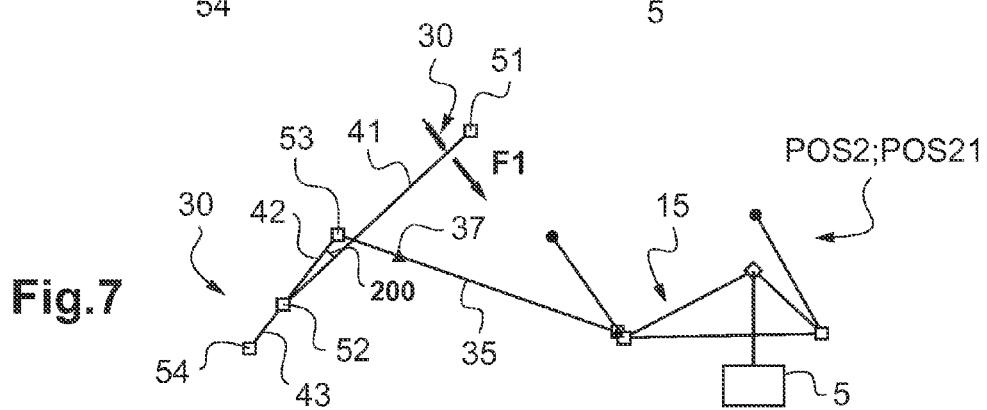

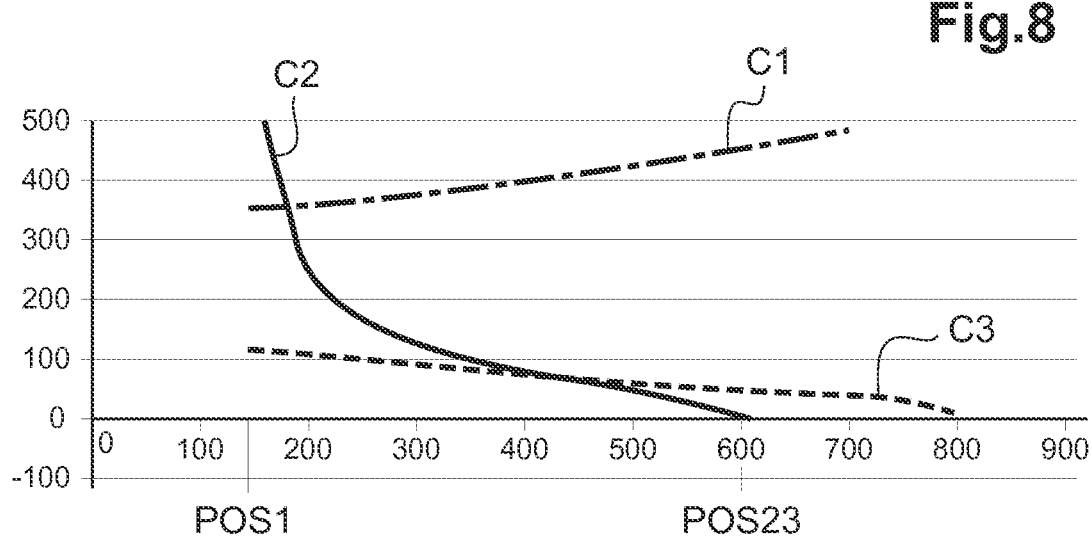
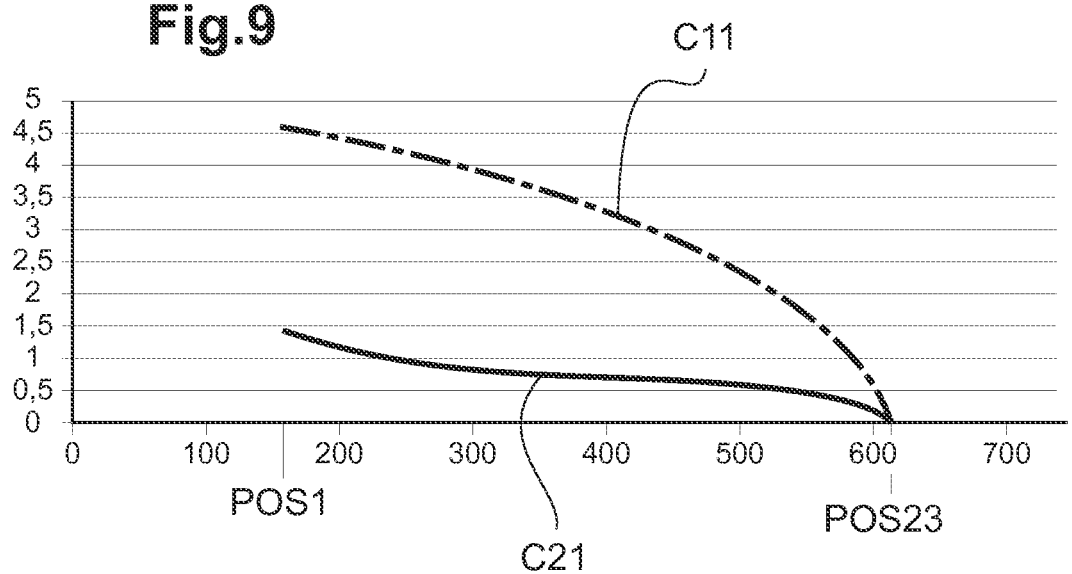

SUSPENSION SYSTEM FOR CARRYING AN EXTERNAL LOAD WITH AN AIRCRAFT, AND AN AIRCRAFT

CROSS REFERENCE TO RELATED APPLICATION

This application claims priority to French patent application No. FR 13 01634 filed on Jul. 10, 2013, the disclosure of which is incorporated in its entirety by reference herein.

BACKGROUND OF THE INVENTION (1) Filed of the Invention

The present invention relates to a suspension system for carrying an external load with an aircraft, and it also relates to an aircraft equipped with such a device and to an associated method.

The technical field of the invention is thus the field of systems making it possible to fasten an external load to an aircraft, and in particular to a rotary-wing aircraft.

(2) Description of Related Art

Conventionally, an aircraft has a structure for carrying an external load that is independent of that aircraft, referred to for convenience as a "load-carrier" structure. The load-carrier structure may include fuselage frames of the aircraft, or also a sponson, for example.

The aircraft may then be provided with a suspension system connected to the load-carrier structure in order to carry an external load. The suspension system thus includes a coupling device that is attached under the load-carrier structure.

By way of example, the coupling device may be provided with coupling means of the hook type. A sling is then attached to the hook in order to enable it to carry external loads.

The coupling device may also comprise a fastener device in order to suspend the coupling means from the load-carrier structure. That fastener device may be:

a first device of the universal joint type having two mutually orthogonal pivot axes;

a second device known as a "swing" and comprising a pyramid-shaped framework suspended from the load-carrier structure, e.g. by suspension cables called "pendants"; and a third device implementing a beam to which the hook is coupled, the beam generally being fastened at at least two points to the load-carrier structure.

On an aircraft having a lift rotor, the suspension system is advantageously arranged near the rotor axis of that lift rotor, in order to limit the disturbances generated by that suspension system on the attitude of the aircraft. In the same manner, the fuel tanks of an aircraft may also be arranged near said rotor axis. Consequently, a suspension system may be located under an aircraft tank during a flight.

Consequently, the suspension system may comprise a return device tending to move the coupling device away from the fuel tanks in the absence of an external load, or from any other member to be preserved. Thus, the return system tends to avoid the risk of the coupling device perforating a sensitive member of the aircraft during a crash.

Such a return device may include at least one resilient member exerting a return force in order to move the coupling device away from a sensitive zone in the absence of an external load. The resilient member may be of the elastic cord type and may for example be connected to the fastener device carrying the coupling means.

When an operator suspends an external load on the suspension system, the resilient member then tends to stretch. The external load thus tends to be aligned vertically under the effect of gravity together with the coupling device, while being positioned in a position called, for convenience, a "working position".

In contrast, when the external load is removed, the resilient member retracts in order to move the coupling device away from the working position by positioning the suspension system in a position called, for convenience, a "storage position". By way of example, the storage position is selected so that the coupling device does not pierce a fuel tank in the event of a crash.

The resilient member exerts a considerable return force on the fastener device, in order to hold it in the storage position in spite of the accelerations to which it is subjected when the aircraft is advancing. That return force further increases as a function of the stretching of the resilient member, and therefore as a function of the external load being carried and of the forward speed of the aircraft.

Consequently, that return force is important for holding the coupling device in the storage position. That return force is even greater in the presence of a load, the resilient member then being stretched. Consequently, that resilient member may disturb the equilibrium of the external load carried in the working position by generating a non-negligible return force.

In addition, when the external load is released, that return force leads to the coupling device returning to the storage position suddenly and quickly. Abutments may be installed in order to avoid an impact with the load-carrier structure. However, the returning fastener device may potentially weaken such abutments. In addition, since the return force is considerable, the fastener device is subjected to acceleration that is also considerable and it is returned in such a manner that it reaches its storage position at high speed. That method requires the system of abutments to be able to absorb the energy corresponding to that high impact speed.

In addition, an operator must exert a considerable tractive force on the suspension system in order to fasten an external load suitably so as to overcome the return force exerted by the resilient member. The further the operator moves the coupling device away from its storage position, the greater the force required by the operator.

In order to overcome those drawbacks, resilient members are known that extend over a great length so as to minimize their stiffness.

Suspension systems may include shock absorbers, blocking means, or also devices that activate depending on the position of the fastener device.

Document U.S. Pat. No. 3,044,818 presents a suspension system provided with a fastener device having a pyramid-shaped framework. That pyramid-shaped framework may include a base having three or four sides and bars rising from the base towards an apex of the framework. The coupling means are located under an opening made in a fuselage.

Documents US 2007/256650, U.S. Pat. No. 6,896,230, U.S. Pat. No. 4,736,641, and FR 2 271 924 do not present teaching relating to the drawbacks of suspension systems provided with a resilient return member.

Document US 2007/256650 describes a mechanical tie for a piston engine or a pump.

Document U.S. Pat. No. 6,896,230 describes a hinged arm supporting an article on a desk.

Document U.S. Pat. No. 4,736,641 presents a device for motorizing a gate.

Document FR 2 271 924 describes a parallelogram transmission mechanism for producing a compressive force, in particular in a compactor of household refuse.

Documents US 2007/256650, U.S. Pat. No. 6,896,230, U.S. Pat. No. 4,736,641, and FR 2 271 924 thus do not come within the technical field of suspension systems for aircraft.

Documents JP 2010/280382, U.S. Pat. No. 3,845,937, U.S. Pat. No. 3,227,401, and U.S. Pat. No. 2,364,042 also lie outside the field of the invention.

BRIEF SUMMARY OF THE INVENTION

The present invention thus relates to a suspension system for carrying an external load with an aircraft, the invention seeking to overcome the drawbacks of systems comprising a return device provided merely with at least one resilient return member.

In the invention, a suspension system for carrying an external load with an aircraft comprises a coupling device for carrying said external load. In addition, the coupling device comprises coupling member suitable for carrying a sling, such as a coupling member of the hook type for example. The suspension system also has a return device tending to place the coupling device in a storage position in the absence of an external load while allowing the coupling device to move towards a working position in the presence of an external load.

The return device comprises:

a linkage provided with a plurality of bars that are hinged together in pairs in order to apply a non-linear force to the coupling device, said linkage being suitable for fastening to a load-carrier structure of an aircraft;

a tie connecting said linkage to the coupling device; and a spring member fastened to a bar of the linkage and suitable for being connected to an aircraft.

A "plurality of bars hinged together in pairs" means that two adjacent bars are hinged to each other.

The spring member exerts a force on one bar of the linkage to tend to move it towards the storage position through a limited amplitude.

In contrast, the use of a linkage makes it possible to obtain in return a large amplitude of movement for other bars of the linkage.

In the storage position, the linkage is opened out so as to exert a considerable force on the tie and thus on the coupling device. In contrast, in the working position, the linkage is folded up and exerts little force on the tie.

The linkage is said to be "folded up" when the volume it occupies is at a minimum, the bars being substantially parallel with one another. Conversely, the linkage is opened out by moving at least two bars apart from each other.

Consequently, the efficiency of the return device is high in the storage position and low in a working position, where the efficiency corresponds to the quotient of the output torque exerted by the linkage on the tie divided by the input torque exerted on the linkage by the spring member.

In view of the small movement caused by the spring member, the input torque is substantially constant, whereas the output torque is clearly greater in the opened out position than in the folded up position of the linkage.

Consequently, the return device exerts a force on the coupling device that is at a maximum when the linkage is opened out. This force makes it possible to hold the coupling device in the storage position despite the strong accelerations to which it may be subjected in flight.

In contrast, the return device exerts a force on the coupling device that is small when the linkage is opened out. Consequently, the return device has a limited effect on the coupling device in a storage position.

In addition, the variation in the return force when the coupling device moves from a storage position to a working position does not vary linearly. On the contrary, this return force decreases very quickly from the storage position to a minimum value. Consequently, the force required by an operator to counter this return force during handling of the suspension system is especially significant when the suspension system is in the storage position.

Finally, the linkage gives rise to a speed of travel speed of the coupling device from a working position towards the storage position that is minimized relative to the prior art.

Thus, the invention goes against prejudices by proposing a return device that serves to generate a maximum linear force when the coupling device is in the storage position.

The suspension system may also include one or more of the following characteristics.

Thus, the linkage may be a Watt linkage provided with:

a primary end bar extending from a first primary end suitable for being hinged to an aircraft towards a second primary end hinged to a first intermediate end of an intermediate bar; and a secondary end bar extending from a first secondary end suitable for being hinged to an aircraft towards a second secondary end hinged to a second intermediate end of an intermediate bar.

A small angular movement of the primary end bar may result in a considerable angular movement of the secondary end bar.

Such a Watt linkage is used in innovative manner within the context of a suspension system. Indeed, a Watt linkage is usually used to transform a simple movement into a complex movement resulting from the combination of several movements.

In the folded up position of the linkage obtained when the coupling device is in a working position, the three bars of the linkage are substantially parallel. In contrast, in the opened out position, the primary and secondary end bars are no longer parallel.

Consequently, the spring member may be fastened to the primary end bar.

This spring member may comprise at least one spring, or any known member likely to generate a return force such as a block of resilient material.

In addition, the spring member is optionally fastened to the primary end bar between a first primary end of the primary end bar and the middle of said primary end bar. This arrangement optimizes the efficiency of the linkage.

Furthermore, the tie is optionally fastened to a hinge connecting the second secondary end to the second intermediate end of an intermediate bar. This hinge represents the geographical area of the linkage moving over its greatest amplitude.

In addition, the primary end bar as well as the secondary end bar and the intermediate bar advantageously all extend over different lengths in order to optimize operation of the linkage.

By way of example, the primary end bar presents a first length that is greater than a second length of the secondary end bar, and the second length is greater than a third length of the intermediate bar.

In another aspect, the tie may be resilient, such as an elastic cord. However, the invention makes it possible to use a tie that is not very resilient or not at all resilient such as a cable. A cable is of length that is inherently constant compared with an elastic cord. Such a cable makes it possible to preserve the feature of non-linear operation made available by the Watt linkage.

In addition, the return device may include at least one transmitter pulley interposed between the linkage and the coupling device in order to guide the tie between the linkage and the coupling device.

Furthermore, the coupling device may include coupling means suspended from a fastener device, the tie then possibly being connected to the fastener device. By way of example, the tie exerts a force on a fastener device of the swing type.

Depending on the nature of the fastener device, the tie may exert a force directly on the coupling means.

The invention also provides an aircraft provided with a load-carrier structure and with a suspension system for carrying an external load. The suspension system is thus of the type described above, the coupling device being suspended under the load-carrier structure, the linkage and the spring member being hinged to the load-carrier structure.

Each bar of the linkage may be placed in a horizontal plane that is perpendicular to a vertical anteroposterior plane of symmetry of the aircraft.

BRIEF DESCRIPTION OF THE SEVERAL VIEWS OF THE DRAWINGS

The invention and its advantages appear in greater detail in the following description of embodiments given by way of illustration and with reference to the accompanying figures, in which:

FIG. 1 is a diagrammatic view of an aircraft of the invention;

FIG. 2 is a view showing a coupling device in a storage position;

FIG. 3 is a view showing a linkage of the invention;

FIGS. 4 to 7 are views explaining the operation of the invention; and

FIGS. 8 and 9 are diagrams quantifying the advantages resulting from the invention.

Elements that are present in more than one of the figures are given the same reference in each of them.

DETAILED DESCRIPTION OF THE INVENTION

Three mutually orthogonal axes referenced X, Y, and Z are shown in some of the figures.

The first direction X is said to be longitudinal. The term "longitudinal" is relative to any direction parallel to the first direction X.

The second direction Y is said to be "transverse". The term "transverse" is relative to any direction parallel to the second direction Y.

Finally, the third direction Z is said to be "in elevation". The expression "in elevation" is relative to any direction parallel to the third direction Z.

FIG. 1 shows an aircraft 1, such as a rotorcraft and in particular a helicopter, for example. This aircraft 1 is provided with a load-carrier structure 2 capable of carrying an external load 5.

Consequently, the aircraft 1 is provided with a suspension system 10 suspended under the load-carrier structure 2 for carrying a load 5.

This suspension system includes a coupling device 15 from which the load 5 is suspended.

Thus, the coupling device 15 is fitted with a coupling member 20 of the hook type, for example. A load 5 is then suspended from the coupling member, possibly by a sling 21.

The coupling device may also include a conventional fastener device 100 hinging the coupling means to the load-carrier structure 2.

In the example shown, the fastener device 100 is a device of the "swing" type. Consequently, the fastener device is provided with a pyramid-shaped framework extending in elevation from a frame 16 towards an apex 18 by means of edges 17. The framework is then carried by the load-carrier structure 2 using pendants 101.

It should be understood that the invention applies to any type of fastener device.

In addition, the suspension system is provided with a return device 30. The return device has the function of tending to position the coupling device in a position that can be seen in FIG. 2 and that is referred to as the "storage position POS1", by way of example in order to move this coupling device away from a fuel tank in the absence of a load. In addition, the return device 30 allows the coupling device to be placed in a position that can be seen in FIG. 1 and that is referred to as the "working position POS2", when a load is suspended from the coupling device.

To this end, the return device is provided with a linkage 40 capable of being folded up and opened out and that is hinged by "main" hinges 51, 54 to at least one point on the load-carrier structure 2.

This linkage has a plurality of bars 41, 42, 43. Adjacent pairs of bars are hinged together by "secondary" hinges 52, 53.

In addition, the return device includes a tie 35 extending from the linkage 40 to the coupling device 15. The tie 35 may be fastened to a hinge of the linkage or also to a bar of said linkage. The tie 35 may be fastened to the coupling member 20 or to a fastener device 100 of the coupling device 15.

The tie 35 may be resilient by being of the elastic cord type for example, but it need not be, possibly being of the cable type.

At least one pulley 37 of the return device 30 may further guide the tie between the linkage 40 and the coupling device 15.

In addition, the return device is provided with a spring member that is fastened to a bar of the linkage and to the load-carrier structure 2.

Advantageously, each bar 41, 42, 43 of the linkage 40 is placed in a horizontal plane P2 that is perpendicular to a vertical anteroposterior plane P1 of symmetry of the aircraft 1.

In addition, the spring member may comprise a spring arranged substantially in such a horizontal plane P2. This spring member therefore cannot be seen in FIG. 1.

With reference to FIG. 3, the linkage 40 may be a Watt linkage.

Thus, the linkage is provided with a primary end bar 41 as well as with an intermediate bar 42 and a secondary end bar 43.

The primary end bar 41 extending from a first primary end 41' that is hinged by a first main hinge 51 to the load-carrier structure 2, towards a second primary end 41". The second primary end 41" is thus hinged to a first intermediate end 42' of the intermediate bar 42 by a first secondary hinge 52.

The secondary end bar 43 then extends from a first secondary end 43' that is hinged to the load-carrier structure 2 by a second main hinge 54, towards a second secondary end 43". The second secondary end 43" is then hinged to a second intermediate end 42" of the intermediate bar 42 by a second secondary hinge 53.

Consequently, the spring member 36 may be hinged to the load-carrier structure and to the primary end bar 41. More precisely and as in the example of FIG. 3, the spring member 36 is fastened to the primary end bar 41 between the first primary end 41' and the middle 41''' of said primary end bar 41.

The tie may further be fastened on the second secondary hinge 53 that connects the second secondary end 43" of the secondary end bar 43 to the second intermediate end 42" of an intermediate bar 42.

In addition, the primary end bar 41 presents a first length L1 extending from its first primary end 41' to its second primary end 41". In the same way, the secondary end bar 43 presents a second length L2 extending from its first secondary end 43' to its second secondary end 43", the intermediate bar 42 presents a third length L3 extending from its first intermediate end 42 to its second intermediate end 42". By way of example, the first, second, and third lengths L1, L2, and L3 respectively may be measured more precisely between the first main hinge 51 and the first secondary hinge 52, between the second secondary hinge 53 and the second main hinge 54, and between the first secondary hinge 52 and the second secondary hinge 53.

The first length L1, the second length L2, and the third length L3 are different. By way of example, the first length L1 is thus greater than the second length L2 and said second length L2 is greater than the third length L3.

The first length L1, the second length L2, and the third length L3 may respectively be of the order of 0.82, 0.46, and 0.29 times a reference distance L0 in order to confer a strongly non-linear character to the device. This reference distance represents the center-to-center distance between the main hinges 51, 54.

The first length L1, the second length L2, and the third length L3 thus enable the primary end bar 41 and the intermediate bar 42 to be folded up almost completely on each other in the storage position, and to be almost completely in alignment in the working position.

FIGS. 4 to 7 are views explaining the operation of the suspension system. It can be seen that the linkage should be located in a plane that is substantially orthogonal to the plane of the sheet of drawings. However, this linkage is shown in the plane of the sheet of drawings with the obvious aim of facilitating its visualization.

With reference to FIG. 4, the spring member 36 exerts a force on the linkage tending to open out said linkage. The primary end bar 41 is then separated from the intermediate bar 42 by an angle 200 that is obtuse for example.

Consequently, the linkage exerts a maximum tractive force on the tie 35 in such a manner as to move the coupling device by bringing it closer to the load-carrier structure with a swinging movement for example.

The coupling device is then in the storage position POS1.

With reference to FIGS. 5 to 7, when a load 5 is suspended from the coupling device 15, said load 5 exerts a force on the coupling device and thus on the tie 35. Consequently, the load 5 tends to fold up the linkage. The spring member 36 thus extends along the arrow F1. In a working position, the primary end bar 41 may then be separated from the intermediate bar 42 by an angle 200 that is acute.

The suspension system is then located in a working position POS2.

When the aircraft remains hovering and with reference to FIG. 5, the suspension system and in particular the coupling device are in an intermediate working position POS22. The linkage is thus folded up by a medium amount, the angle 200 possibly being about 45 degrees for example.

With reference to FIG. 6, when the aircraft moves in a direction going from the linkage 30 towards the coupling device 15, its travel speed tends to bring the coupling device 15 closer to the linkage 30. The suspension system and in particular the coupling device are in a slightly folded up working position POS21. The linkage is thus folded up by a small amount, the angle 200 possibly being greater than 45 degrees for example.

Conversely, and with reference to FIG. 7, when the aircraft moves in a direction going from the coupling device 15 towards the linkage 30, its travel speed tends to move the coupling device 15 further away from the linkage 30. The suspension system and in particular the coupling device are in a significantly folded up working position POS23. The linkage is thus folded up by a large amount, the angle 200 being at a minimum.

It should be observed that the linkage 30 may include abutments in order to limit movement of the bars. By way of example, interference means may prevent folding up from going beyond the folded up position shown diagrammatically in FIG. 7, or even beyond the folded up position shown in FIG. 4. The views in FIGS. 4 and 7 may thus respectively show the extreme opened out and folded up positions between which the linkage moves.

Thus, the secondary hinges 52, 53 may project from corresponding bars to form abutments with the remaining bar. In other words, and in the position shown in FIG. 7, the first secondary hinge 52 comes into abutment against the primary end bar 41, the second secondary hinge 53 being in abutment against the secondary end bar 43.

FIGS. 8 and 9 are diagrams quantifying the advantages resulting from the invention.

The curve C3 represents the minimum force required by the return device in order to hold the swing in position under a vertical acceleration of 1 g.

In FIG. 8, the curve C1 presents the variation of the force exerted by an elastic cord of the prior art depending on the position of the coupling device. It can be seen that this force increases linearly from the storage position POS1 towards the working position furthest away from the storage position. By way of example, the minimum requirement for holding in the storage position POS1 is fixed at 4 g.

On the contrary, the curve C2 presents the force exerted by the linkage on the storage device as a function of the position of the coupling device.

The angular clearance of the bar 41 of the linkage that is connected to the spring member is small. Consequently, the force exerted by this spring member is considered to vary little.

With reference to the curve C2, the linkage induces a force on the non-linear tie that decreases very quickly.

Thus, by exerting an adequate return force on the linkage in the storage position POS1, a return force is obtained that is very high and that is exerted by said linkage on the coupling device.

In addition, this return force is greatly reduced as soon as the coupling device is moved away from its storage position.

Consequently, the invention makes it possible to hold the storage device in position in the absence of a load without requiring an oversized spring. In addition, since the return device exerts a reasonable force on the storage device in a working position, an operator is able to handle the system more simply than for a system of the prior art.

FIG. 9 presents the variation in the travel speed of the coupling device moving from a working position towards the storage position POS1 respectively for a prior art system with curve C11 and for a system of the invention with the curve C21. The travel speed is plotted up the ordinate axis and the position of the coupling device is plotted along the abscissa axis.

It should be observed that, compared with a prior art system shown by the curve C11, the travel speed of the coupling device moving from a working position towards the storage position POS1 is lower with the invention, as shown by the curve C21.

The invention thus makes it possible to avoid the coupling device returning suddenly to the storage position when a load 5 is uncoupled from the aircraft.

Naturally, the present invention may be subject to numerous variations as to its implementation. Although several embodiments are described, it should readily be understood that it is not conceivable to identify exhaustively all possible embodiments. It is naturally possible to envisage replacing any of the means described with equivalent means without going beyond the ambit of the present invention.

What is claimed is:

1. A suspension system for carrying an external load with an aircraft, the suspension system comprising:
    a coupling device for carrying the external load, the coupling device comprising a coupling member suitable for carrying a sling;
    a return device tending to place the coupling device in a storage position while fastened to the aircraft absent the external load while allowing the coupling device to move towards a working position when the external load is present;
    wherein the return device comprises:
    a linkage provided with a plurality of rigid bars that are hinged so that two adjacent bars are hinged to each other in order to apply a non-linear force to the coupling device, the linkage being suitable for fastening to a load-carrier structure of the aircraft;
    a tie connecting the linkage to the coupling device; and
    a spring member fastened to a bar of the linkage and suitable for being connected to the aircraft.

2. The suspension system according to claim 1, wherein the linkage is a Watt linkage such that the plurality of bars comprises:
    a primary end bar extending from a first primary end suitable for being hinged to the load carrier structure of the aircraft towards a second primary end hinged to a first intermediate end of an intermediate bar; and
    a secondary end bar extending from a first secondary end suitable for being hinged to the load carrier structure of the aircraft towards a second secondary end hinged to a second intermediate end of the intermediate bar.

3. The suspension system according to claim 2, wherein the spring member is fastened to the primary end bar.

4. The suspension system according to claim 3, wherein the spring member is fastened to the primary end bar between a first primary end of the primary end bar and the middle of the primary end bar.

5. The suspension system according to claim 2, wherein the tie is fastened to a hinge connecting the second secondary end to the second intermediate end of the intermediate bar.

6. The suspension system according to claim 2, wherein each of the primary end bar, the secondary end bar and the intermediate bar are different lengths.

7. The suspension system according to claim 6, wherein the primary end bar presents a first length that is greater than a second length of the secondary end bar, and the second length is greater than a third length of the intermediate bar.

8. The suspension system according to claim 1, wherein the tie is a cable.

9. The suspension system according to claim 1, wherein the return device includes at least one transmitter pulley interposed between the linkage and the coupling device.

10. The suspension system according to claim 1, wherein the coupling device includes coupling means suspended from a fastener device, the tie being connected to the fastener device.

11. An aircraft provided with a load-carrier structure and with the suspension system of claim 1 for carrying the external load, the linkage suspended under the load-carrier structure, the linkage and the spring member being hinged to the load-carrier structure.

12. The aircraft according to claim 11, wherein each bar of the linkage is placed in a horizontal plane that is perpendicular to a vertical anteroposterior plane of symmetry of the aircraft.

13. A suspension system for carrying an external load with an aircraft, the suspension system comprising:
    a coupling device arranged to carry the external load with a sling, wherein the coupling device is movable between a storage position and a working position;
    a return device connected to the coupling device to move the coupling device between the storage position and the working position while fastened to the aircraft, the return device comprising:
    a linkage having a plurality of rigid bars wherein distal ends of the linkage are a fixed distance relative to each other and two adjacent bars are hinged to each other;
    a tie connecting the linkage to the coupling device; and
    a spring member fastened to one of the plurality of bars of the linkage,
    wherein the return device applies a non-linear force to the coupling device so that the return device moves the coupling device in the storage position when the external load is absent and allows the coupling device to move to the working position when the external load is present.

14. The suspension system according to claim 13, wherein the plurality of bars comprises three bars including a primary end bar hingedly fixed at a first primary end and hinged at a second primary end to a first intermediate end of an intermediate bar and a secondary end bar hingedly fixed at a first secondary end and hinged to a second intermediate end of the intermediate bar at a second secondary end.

15. The suspension system according to claim 14, wherein the spring member is fastened to the primary end bar.

16. The suspension system according to claim 14, wherein the tie is fastened to a hinge connecting the intermediate bar to one of the primary bar and the secondary bar.

17. The suspension system according to claim 14, wherein in the storage position, the secondary end bar is positioned at an obtuse angle relative to the intermediate bar, and in the working position, the secondary end bar is positioned at an acute angle relative to the intermediate bar.

18. An aircraft provided for carrying an external load, the aircraft comprising:
    a load-carrier structure of the aircraft;
    a coupling device fastened to the load-carrier structure of the aircraft to carry the external load with a sling, the coupling device movable between a storage position and a working position;
    a return device fastened to the load-carrier structure of the aircraft and connected to the coupling device to move the coupling device between the storage position and the working position, the return device comprising:
    a linkage hingedly fixed to the load-carrier structure of the aircraft at a primary end and a secondary end and having a plurality of rigid bars arranged so that two adjacent bars are hinged to each other;
    a tie connecting the linkage to the coupling device; and a spring member connected between one of the plurality of bars of the linkage and the load-carrier structure of the aircraft, wherein the return device applies a non-linear force to the coupling device so that the return device moves the coupling device to the storage position when the external load is absent and allows the coupling device to move to the working position when the external load is present.

19. The aircraft according to claim 18, wherein each of the plurality of bars of the linkage are disposed in a horizontal plane that is perpendicular to a vertical anteroposterior plane of symmetry of the aircraft.

20. The aircraft according to claim 18, wherein the plurality of bars comprises three bars including a primary end bar hingedly fixed at a first primary end and hinged at a second primary end to a first intermediate end of an intermediate bar and a secondary end bar hingedly fixed at a first secondary end and hinged to a second intermediate end of the intermediate bar at a second secondary end.

* * * * *